(12) United States Patent
Greb et al.

(10) Patent No.: US 11,965,596 B2
(45) Date of Patent: Apr. 23, 2024

(54) PARKING LOCK ACTUATION SYSTEM WITH ELECTROMECHANICAL LOCKING FUNCTION, DRIVE DEVICE, AND ACTUATION METHOD

(71) Applicant: Schaeffler Technologies AG & Co. KG, Herzogenaurach (DE)

(72) Inventors: Peter Greb, Ottersweier (DE); Jens Mühlhausen, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/003,293

(22) PCT Filed: Jun. 8, 2021

(86) PCT No.: PCT/DE2021/100490
§ 371 (c)(1),
(2) Date: Dec. 23, 2022

(87) PCT Pub. No.: WO2022/002300
PCT Pub. Date: Jan. 6, 2022

(65) Prior Publication Data
US 2023/0243421 A1    Aug. 3, 2023

(30) Foreign Application Priority Data
Jun. 29, 2020 (DE) .................... 10 2020 116 983.3

(51) Int. Cl.
*F16H 63/34* (2006.01)
*B60R 16/03* (2006.01)

(52) U.S. Cl.
CPC ..... *F16H 63/3433* (2013.01); *F16H 63/3475* (2013.01); *F16H 63/3483* (2013.01); *B60R 16/03* (2013.01)

(58) Field of Classification Search
CPC .. F16H 63/3433; F16H 63/3483; F16H 63/36; F16H 63/3416–3491; F16H 63/48–483
See application file for complete search history.

(56) References Cited

U.S. PATENT DOCUMENTS

2003/0019702 A1  1/2003  Goedecke et al.
2007/0191182 A1  8/2007  Koski et al.
(Continued)

FOREIGN PATENT DOCUMENTS

DE    4127991 A1    2/1993
DE    10136425 A1   2/2003
(Continued)

OTHER PUBLICATIONS

See Corresponding Search Report for International Application PCT/DE2021/100490.

*Primary Examiner* — Jacob S. Scott
*Assistant Examiner* — Farhana Pervin
(74) *Attorney, Agent, or Firm* — Davidson, Davidson & Kappel, LLC

(57) ABSTRACT

A parking lock actuation system for a motor vehicle includes an actuation element that can be moved between a locking position, in which a parking lock of the motor vehicle is active, and an unlocking position, in which the parking lock is inactive. The system also includes a locking element which is designed to fix the actuation element in the unlocking position in a form-fitting manner; and an electric actuator which has an adjusting effect on the locking element. A current circuit which has an autonomous power source is connected to the electric actuator, and a bistable switch and a monostable opener arranged in series to the bistable switch are used in the current circuit.

20 Claims, 6 Drawing Sheets

(56) References Cited

U.S. PATENT DOCUMENTS

| | | | |
|---|---|---|---|
| 2014/0110216 A1* | 4/2014 | Pollack | F16H 63/3483 |
| | | | 192/219.4 |
| 2018/0119816 A1* | 5/2018 | Gollmer | F16H 63/3483 |
| 2019/0085974 A1* | 3/2019 | Kidachi | B60W 30/18 |
| 2019/0271395 A1* | 9/2019 | Schwegler | F16H 63/3433 |
| 2020/0096102 A1* | 3/2020 | Kasami | F16H 63/3475 |
| 2021/0197771 A1* | 7/2021 | Frister | F16H 63/3475 |
| 2023/0097586 A1* | 3/2023 | Van Druten | F16H 63/3483 |
| | | | 192/219.4 |

FOREIGN PATENT DOCUMENTS

| | | |
|---|---|---|
| DE | 102006053762 A1 | 6/2007 |
| DE | 102007006354 A1 | 8/2007 |
| DE | 102006049639 A1 | 4/2008 |
| DE | 102008011898 A1 | 9/2009 |
| DE | 102017102804 A1 | 8/2018 |

\* cited by examiner

PARKING LOCK ACTUATION SYSTEM WITH ELECTROMECHANICAL LOCKING FUNCTION, DRIVE DEVICE, AND ACTUATION METHOD

CROSS-REFERENCE TO RELATED APPLICATIONS

This application is the U.S. National Phase of PCT Appln. No. PCT/DE2021/100490 filed Jun. 8, 2021, which claims priority to DE 10 2020 116 983.3, filed Jun. 29, 2020, the entire disclosures of which are incorporated by reference herein.

TECHNICAL FIELD

The present disclosure relates to a parking lock actuation system for a motor vehicle, preferably a hybrid or purely electric motor vehicle, having an actuation element, which actuation element can be moved between a locking position, in which a parking lock of the motor vehicle is active/an output component of the motor vehicle is locked against rotation, and an unlocking position, in which the parking lock is inactive/the rotation of the output component of the motor vehicle is released, with a locking element designed to positively fix/hold the actuation element in its unlocking position and an electric actuator that has an adjusting effect on the locking element. Furthermore, the present disclosure relates to a drive device for a motor vehicle having this parking lock actuation system and a method for actuating this parking lock actuation system.

BACKGROUND

Generic parking lock actuation systems are already known from the prior art. For example, DE 10 2017 102 804 A1 discloses a device and a method for actuating a parking lock.

Other parking lock actuation systems, in particular having locking elements and a corresponding connection for realizing, for example, bistable parking lock states, are known from DE 10 2006 049 639 A1, DE 10 2007 006 354 A1, DE 10 2006 053 762 A1 and DE 10 2008 011 898 A1.

SUMMARY

With these designs known from the prior art, it has been found that although by means of the parking lock actuation system it is in principle ensured that the parking lock is closed automatically, it is not possible for the motor vehicle to be in a transport state in which a vehicle electrical system is switched off or is not sufficiently charged, and the parking lock remains closed.

It is therefore an object of the present disclosure to provide a parking lock actuation system which, with simple means, allows the motor vehicle to be transported independently of the state of charge of a vehicle electrical system of the motor vehicle.

This is achieved according to the present disclosure in that a current circuit having an autonomous (first) power source is connected to the electric actuator and a bistable switch and a monostable opener arranged in series with the bistable switch are used in the current circuit.

The monostable opener enables the parking lock to be actuated in the usual way when the motor vehicle is in operation and ensures its self-closing function. With the bistable switch, it is also possible to reliably open/unlock the parking lock when the motor vehicle is in transport. The autonomous current circuit for the electric actuator, which is decoupled from the vehicle electrical system, can be operated in a stand-alone manner, so that the parking lock can be unlocked during transport independently of the voltage of the vehicle electrical system.

Accordingly, it is also advantageous if the current circuit is equipped with a connecting element for connection to an external power source. The connecting element preferably extends into an interior/passenger compartment of the motor vehicle in order to be able to actuate the parking lock by connecting an external power source and close the parking lock even if all power sources fail.

In addition, it is advantageous if the locking element is provided with a mechanical button for manual operation. This also enables reliable control of the parking lock and in particular manual closing of the parking lock without the need for electrical energy.

It is also advantageous if the monostable opener is designed in such a way that it is closed in its spring-supported basic position. As a result, the current circuit can be actuated independently of the voltage of the vehicle electrical system.

Accordingly, it is also advantageous if the locking element is spring-loaded in such a way that when the actuation element is operated, it automatically locks it in an open position of the parking lock and/or is pressed against the actuation element in a basic position. In a rest position of the system, the locking element therefore forces the actuation element to be positively fixed/held in a corresponding displacement position.

The actuation element is more preferably hydraulically actuated. This results in a reliably functioning parking lock.

Furthermore, the present disclosure relates to a drive device for a motor vehicle, having a parking lock actuation system according to at least one of the above-described embodiments and a control unit that can be coupled or connected to a vehicle electrical system and is connected to independently actuate the bistable switch and the monostable opener.

In this regard, it is also advantageous if a first sub-circuit of the control unit, which controls the monostable opener, implements a direct coupling of a vehicle electrical system power source to the monostable opener. As a result, the connection of the parking lock actuation system is implemented with the simplest possible means.

Alternatively to this, it is advantageous if the first sub-circuit of the control unit controlling the monostable opener implements an indirect coupling of the vehicle electrical system power source via a control device and/or a monostable closer to the monostable opener. This results in a reliable actuatability of the different operating states.

If a second sub-circuit of the control unit is also connected directly to the electric actuator, the actuatability of the parking lock actuation system is further simplified.

Furthermore, the present disclosure relates to a method for actuating a parking lock actuation system according to at least one of the embodiments described above, wherein in a first operating state the bistable switch is closed and the monostable opener is open, so that the current circuit is interrupted and the locking element is engaged in a form-fitting manner with the actuation element, wherein the actuation element is fixed in its unlocking position, and in a second operating state in which a voltage of the vehicle electrical system has fallen to zero or below a specific limit, the monostable opener closes automatically, so that the current circuit is closed and the electric actuator is driven by breaking the form fit between the locking element and the actuation element, so that the actuation element is automatically moved into its locking position.

In this regard, it is also advantageous if (proceeding from) the first operating state, a switch is made to a transport state by opening the bistable switch.

In other words, a parking lock module (parking lock actuation system) with an electromechanical locking function and a method for actuating it are implemented according to the present disclosure. A normal P function (normally activated parking lock) is achieved with a de-energized possibility of an open parking lock. For this purpose, it is proposed that an actuator be energized to open a holding element (locking element) of the actual parking lock actuator via a bistable switch and at least one monostable opener. If the bistable switch is closed, the actuator is powered via a redundant battery in the event of a power failure or if the parking lock is to be actuated.

BRIEF SUMMARY OF THE DRAWINGS

The present disclosure will now be explained in more detail below with reference to figures, in which context various exemplary embodiments are also illustrated.

In the figures.

DETAILED DESCRIPTION

The figures are purely schematic in nature and are intended solely for the purpose of understanding the present disclosure. The same elements are provided with the same reference symbols. In principle, it is also possible to freely combine the different features of the various exemplary embodiments.

Figure 1:
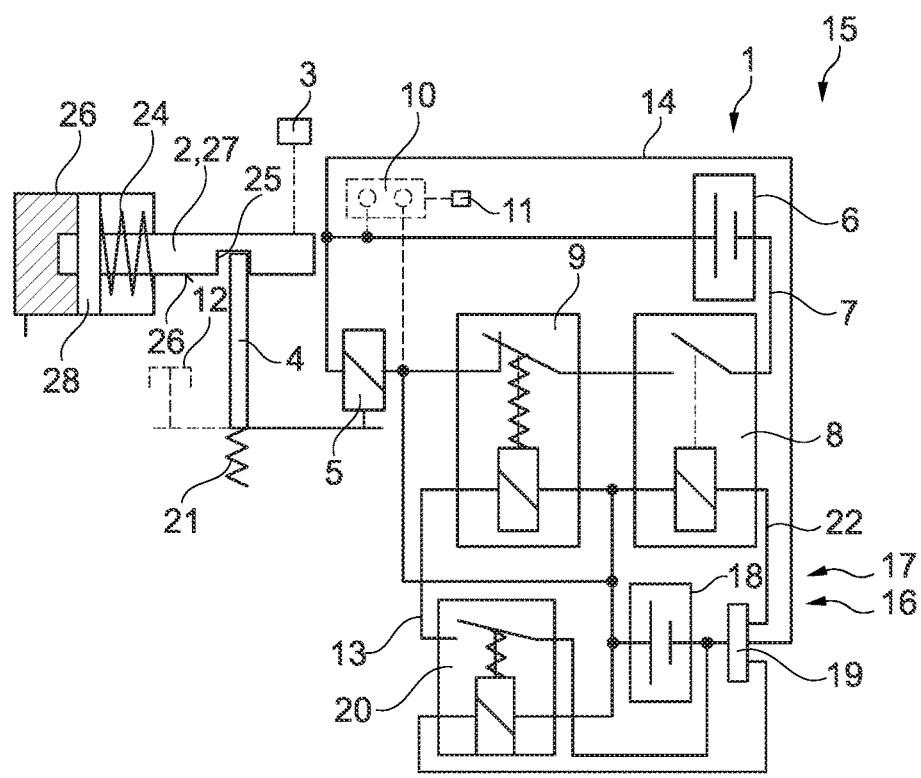
FIG. 1 shows a schematic representation of a parking lock actuation system according to the present disclosure, designed according to a first exemplary embodiment, wherein a basic structure of the parking lock actuation system can be seen and a locking element fixes an actuation element in its unlocking position.

FIG. 1 shows a parking lock actuation system 1 according to the present disclosure, used in a drive device 15 of an electric or hybrid motor vehicle. The parking lock actuation system 1 according to the first exemplary embodiment of FIGS. 1 and 2 is designed to actuate a parking lock 3 and thus serves to adjust the parking lock 3 between its activated state and its inactivated state.

The parking lock actuation system 1 has an actuation element 2 which is mechanically coupled to the parking lock 3, the position of which is indicated, and which acts directly on the parking lock 3. The actuation element 2 is operated/actuated hydraulically. The actuation element 2 is implemented in this embodiment as a push rod 27 with an integrated piston 28 (to form a hydraulic pressure cylinder 26).

Figure 2:
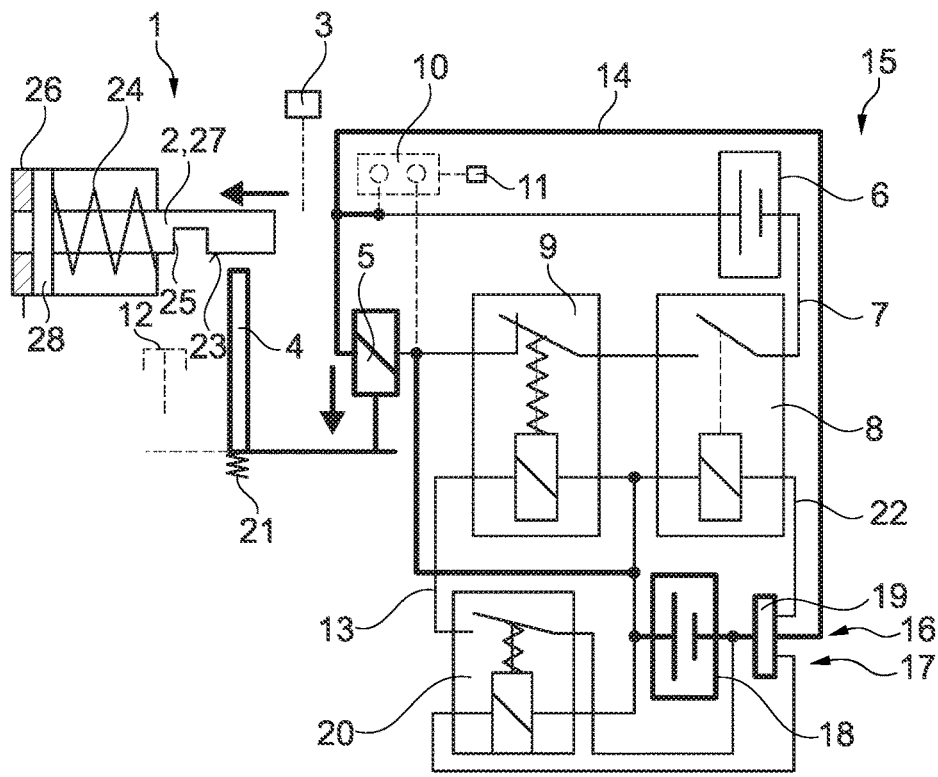
FIG. 2 shows a schematic representation of the parking lock actuation system, similar to FIG. 1, with an electric actuator adjusting the locking element now being actuated via a vehicle electrical system, so that the actuation element acting on the parking lock is released.

It can also be seen from FIG. 2 that the actuation element 2 is spring-loaded by means of a return spring 24 such that it assumes a basic position in a pressureless state and is released for displacement, which corresponds to the locking position of the parking lock 3. The actuation element 2 is thus automatically implemented in a locking manner. While this locking position of the actuation element 2 can be seen in FIG. 2, an unlocking position of the actuation element 2 has been implemented in FIG. 1 in that the parking lock 3 is inactive.

A locking element 4 is provided for locking the actuation element 2 in its unlocking position. The locking element 4 implemented as a pin is prepared for positive engagement in a recess 25/groove of the actuation element 2. The locking element 4 is aligned and can be moved transversely to a longitudinal direction of the actuation element 2. The locking element 4 is biased towards a (radial) outer side 23 of the actuation element 2 by a biasing spring 21. The locking element 4 is thus pressed against the actuation element 2 or on its outer side 23 in a basic position/rest position.

In a corresponding axial position of the actuation element 2, which corresponds to the unlocking position, as can be seen in FIG. 1, the locking element 4 thus automatically engages in a form-fitting manner in the actuation element 2 and, against the spring force of the return spring 24, prevents it from automatically returning to the locking position.

An electric actuator 5 is provided for moving/displacing the locking element 4 from its basic position into a second position/forced position which is out of contact with the actuation element 2 according to FIG. 2. The actuator 5 is implemented as a linear actuator, here in the form of an electric lifting magnet. The actuator 5 is designed and coupled to the locking element 4 in such a way that it can move the locking element 4 against the biasing spring 21.

The actuator 5 is connected to an autonomous current circuit 7. According to the present disclosure, the current circuit 7 is provided with its own (first) power source 6 and two switches 8, 9 connected in series. A first switch 8 is implemented as a bistable switch 8 and referred to as such below, whereas a second switch 9 is implemented as a monostable opener 9 and referred to as such below.

The bistable switch 8 is thus stable in two different switching positions (closed position and open position). The monostable opener 9 is biased towards its closed position. A forced position when driving the monostable opener 9 therefore corresponds to its open position.

To control the two switches 8, 9 of the current circuit 7, the switches 8, 9 are connected to corresponding sub-circuits 13, 22 of the vehicle electrical system 16. The vehicle electrical system 16 is shown in simplified form in FIG. 1 and can be seen in terms of a vehicle electrical system power source 18 and a control device 19 of a control unit 17. In the first exemplary embodiment, the monostable opener 9 is actuated indirectly via a monostable closer 20, which in turn is controlled via the control device 19. The monostable closer 20 is biased toward its open position. A forced position when driving the monostable closer 20 therefore corresponds to its closed position.

In the open position (basic position) of the monostable closer 20 implemented in FIG. 1, the monostable opener 9 is consequently not activated and is in its closed position. If the monostable closer 20 is actuated by the control device 19 and is accordingly supplied with current, it is closed and the monostable opener 9 is opened. The monostable closer 20 is thus used to selectively open and close a first sub-circuit 13 of the vehicle electrical system 16, which is implemented to control the monostable opener 9.

The bistable switch 8 is connected/can be actuated via a further (third) sub-circuit 22 of the vehicle electrical system 16 and has an open position in FIG. 1. The bistable switch 8 is switched over between its open position and a closed position by appropriately actuating this third sub-circuit 22.

Furthermore, a second sub-circuit 14 of the vehicle electrical system 16 is connected to the actuator 5. Thus, in this embodiment, the actuator 5 can also be driven independently of the current circuit 7. With FIG. 2, the actuator 5 is even actuated via this second sub-circuit 14/the vehicle electrical system 16.

A connecting element 10 and an existing button 12 are also indicated in FIGS. 1 and 2, which can be used together or jointly in the parking lock actuation system 1. The connecting element 10 is used to connect an external power source 11, preferably in an interior of the motor vehicle. The actuator 5 can thus also be actuated directly via this connecting element 10 and independently of the first power source 6 and the vehicle electrical system 16. Alternatively or additionally to this, a mechanical/manually operated button 12 is present. The button 12 is mechanically coupled directly to the locking element 4 and therefore allows manual operation of the locking element 4 from the outside.

FIGS. 3 to 10 show a further second exemplary embodiment, with which the various operating states of the parking lock actuation system 1 can be seen particularly clearly. This second exemplary embodiment is constructed and functions substantially in accordance with the first embodiment, so for the sake of brevity only the differences are described below.

Figure 3:
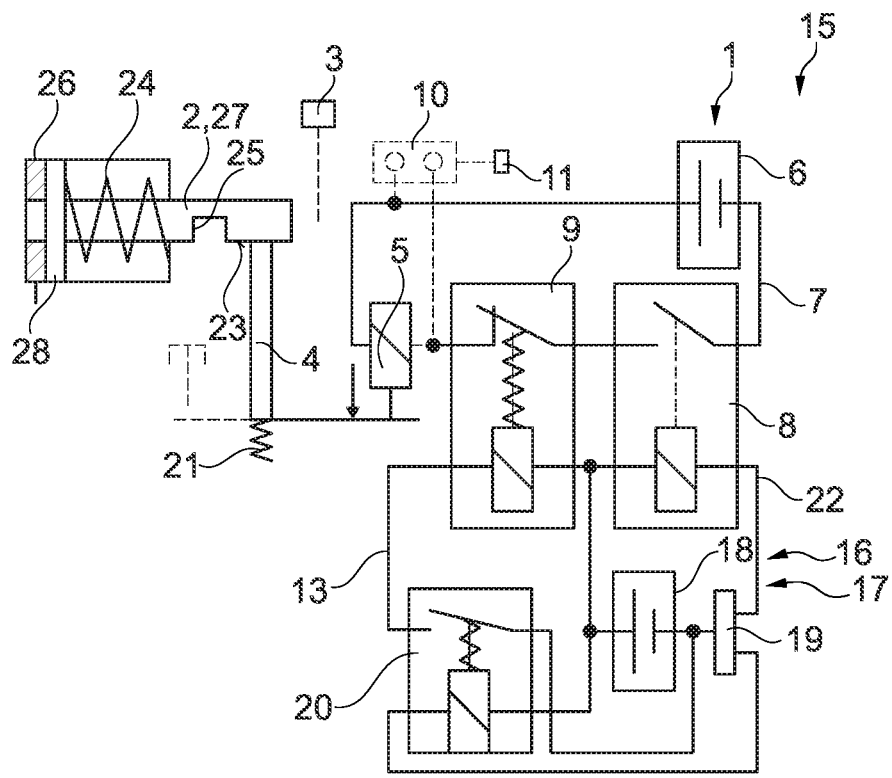
FIG. 3 shows a schematic representation of a parking lock actuation system according to the present disclosure, designed according to a second exemplary embodiment, wherein the electric actuator is now connected to a single current circuit and the system is in a rest position in which the parking lock is active.

As can first be seen in FIG. 3 in a rest position/basic position of the parking lock actuation system 1, in this embodiment there is no direct coupling of the actuator 5 to the vehicle electrical system 16. Accordingly, the actuator 5 can be actuated exclusively via the current circuit 7 or via the optional connecting element 10.

With FIG. 3, a state is first realized in which the parking lock 3 is active and the actuation element 2 is consequently located in its locking position. The locking element 4 is pressed into its basic position and is in contact with an outer side 23 of the actuation element 2, but not in positive engagement with the actuation element 2. Neither the first power source 6 nor the second power source in the form of the vehicle electrical system power source 18 are active and accordingly the monostable closer 20 is open and the monostable opener 9 is closed. The bistable switch 8 is in its open position.

Figure 4:
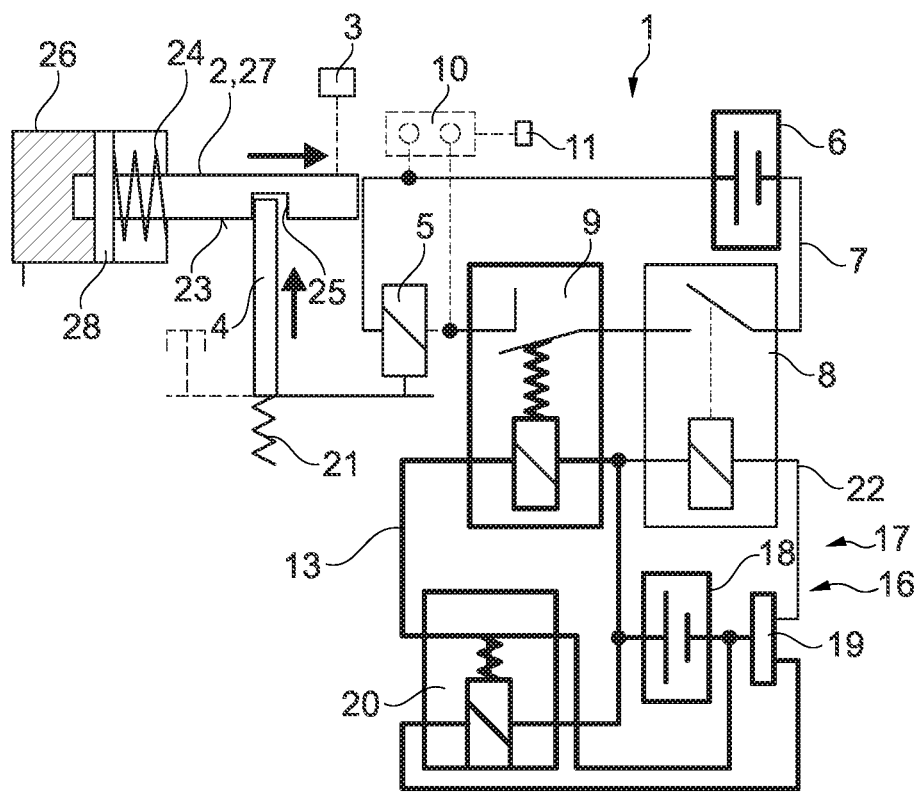
FIG. 4 shows a schematic diagram of the parking lock actuation system of FIG. 3 in a first operating state, in which a monostable opener contained in the current circuit is opened via the vehicle electrical system, wherein the actuation element is moved into its unlocking position, so that the locking element is positively engaged in the actuation element.
Figure 5:
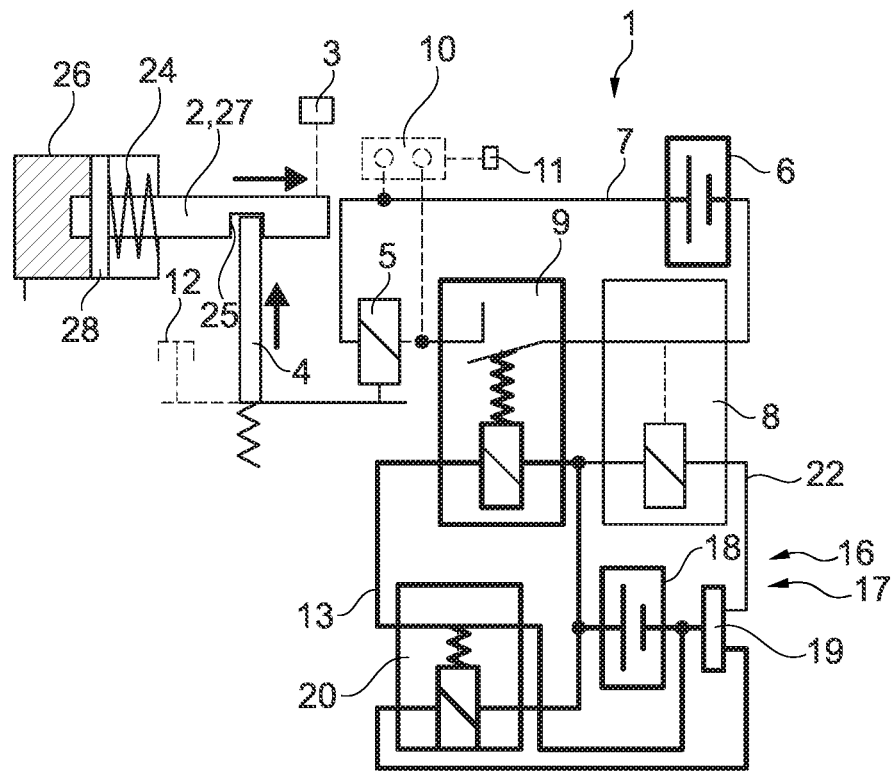
FIG. 5 shows a schematic representation of the parking lock actuation system of FIG. 3, wherein the actuation element is not subjected to hydraulic pressure in comparison to FIG. 4, but is prevented from moving back into the locking position by the locking element.

FIGS. 4 and 5 also show a normal (first) operating state in a driving state of the motor vehicle. In FIG. 4, the parking lock 3 is released first. For this purpose, the actuation element 2 is pressed from its locking position into its unlocking position by means of a hydraulic force, wherein automatic locking/latching of the locking element 4 with the actuation element 2 occurs when the unlocking position is reached. Thus, in the unlocking position of the actuation element 2, the locking element 4 automatically comes into positive engagement with the recess 25/the actuation element 2. After a subsequent renewed pressure reduction on the part of the actuation element 2, according to FIG. 5, the actuation element 2 is supported by the locking element 4 in the unlocking position.

In FIGS. 4 and 5, both the vehicle electrical system power source 18 and the first current 6 have a sufficient state of charge/voltage value. The monostable closer 20 is activated and therefore closed, so that the current circuit 7 is opened by the activation/opening of the monostable opener 9. The bistable switch 8 is in its closed position, so that an automatic closing of the parking lock 3 is made possible in the event of a drop in the vehicle electrical system voltage.

Figure 6:
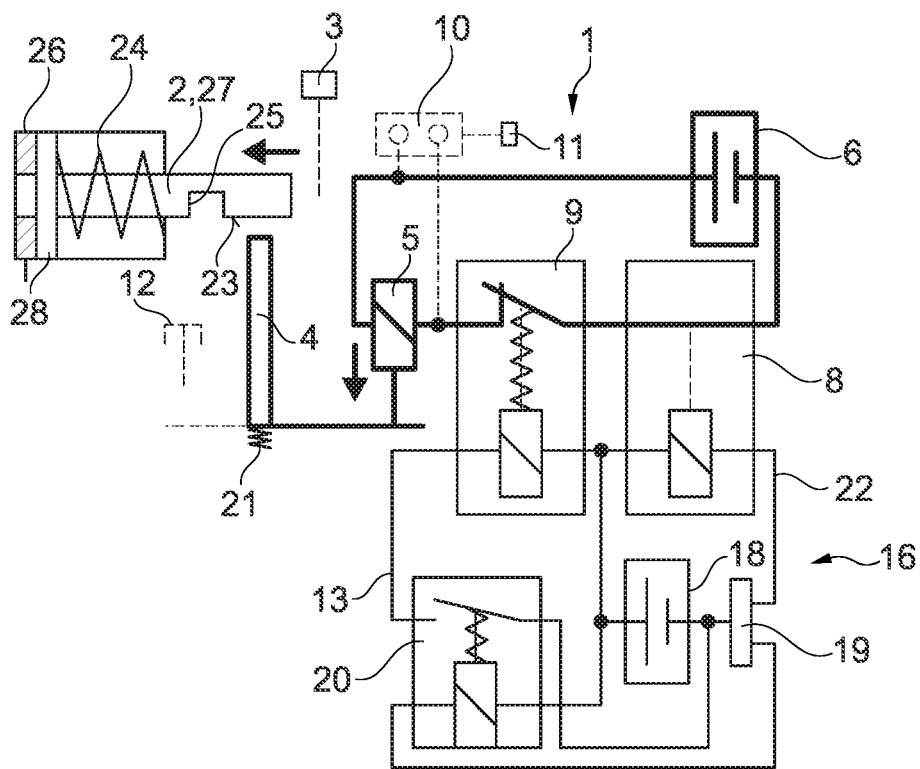
FIG. 6 shows a schematic diagram of the parking lock actuation system of FIG. 3, wherein the parking lock actuation system is in a second operating state in which the current circuit is closed and the actuator which is energized as a result moves the locking element from the position fixed in a form-fitting manner with the actuation element, so that the actuation element independently reaches the locking position.

The process of the automatic closing of the parking lock 3 in a second operating state, in which a voltage of the vehicle electrical system 16 has fallen to zero or below a specific limit, is shown in connection with FIG. 6. If a drop in the vehicle electrical system voltage causes the monostable opener 9 to close automatically, the current circuit 7 is closed and the actuator 5 is driven by the first power source 6, so that the locking element 4 is brought out of positive locking with the actuation element 2. The actuation element 2 then moves automatically into its locking position.

Figure 7:
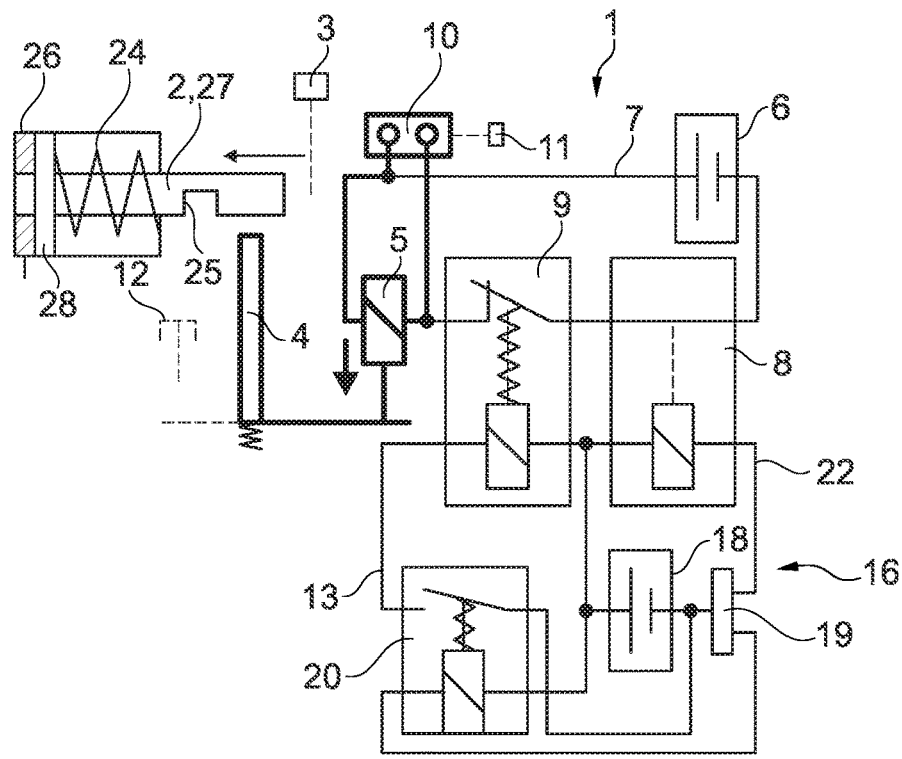
FIG. 7 shows a schematic representation of the parking lock actuation system of FIG. 3, wherein the actuator is now activated by means of a connecting element by an external power source in order to again achieve the state of FIG. 6.
Figure 8:
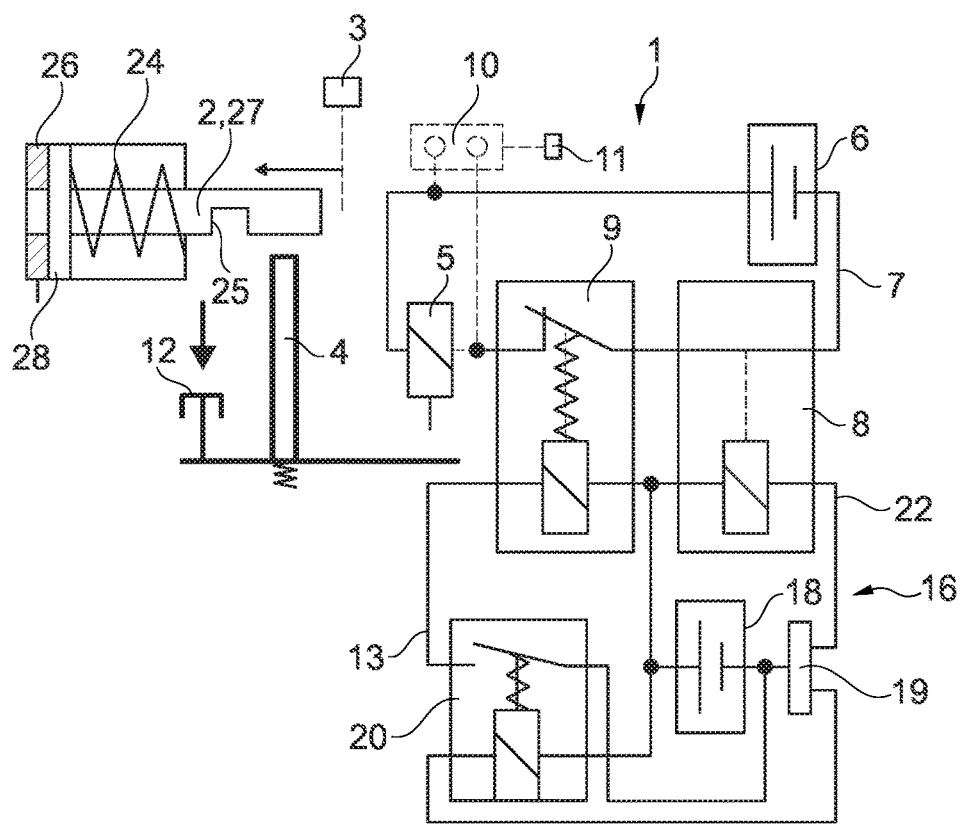
FIG. 8 shows a schematic representation of the parking lock actuation system of FIG. 3, wherein the locking element is unlocked by a mechanical button.

FIGS. 7 and 8 show the functions of the connecting element 10 and the button 12 again in more detail. Accordingly, it is possible both when the vehicle electrical system power source 18 is discharged and when the first power source 6 is discharged, to connect the actuator 5 to the connecting element 10 and to drive it by an external power source 11, so that the form fit between the locking element 4 and the actuation element 2 is eliminated. It is also possible to the actuate locking element 4 directly with the button 12.

Figure 9:
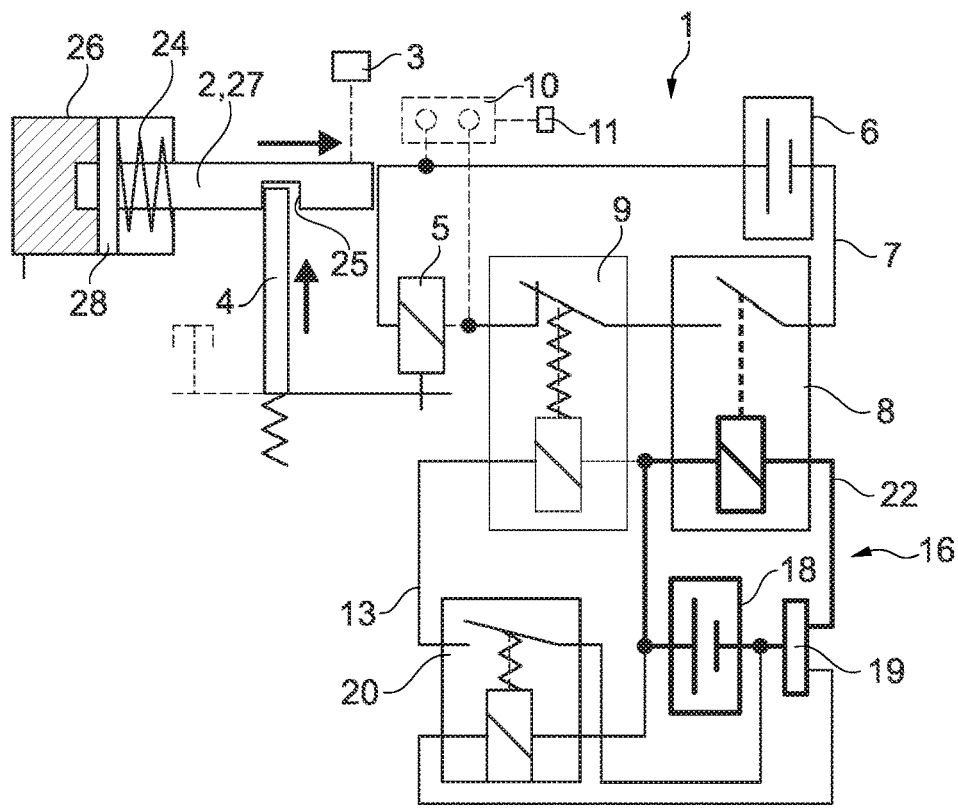
FIG. 9 shows a schematic representation of the parking lock actuation system of FIG. 3 to illustrate a transport state, wherein the bistable switch is activated via the vehicle electrical system in such a way that it is open and at the same time the actuation element is pressed into its unlocking position and the locking element is engaged in the actuation element.
Figure 10:
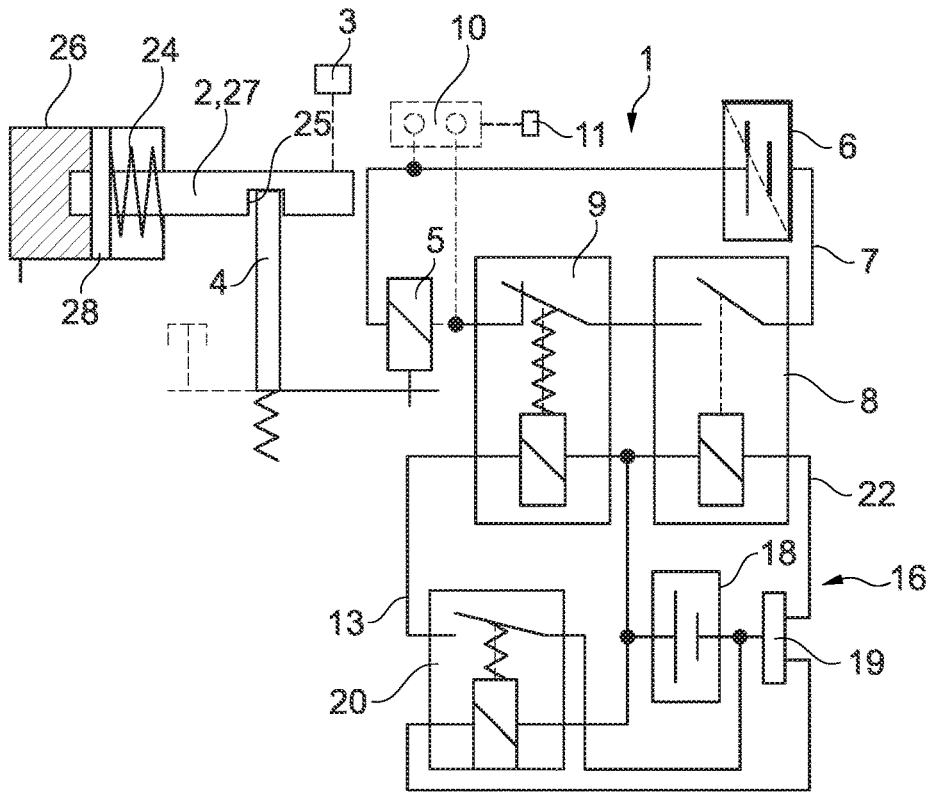
FIG. 10 shows a schematic diagram of the parking lock actuation system, similar to FIG. 9, wherein the actuation element is not subjected to hydraulic pressure in comparison to FIG. 9, but is prevented by the locking element before moving back to the locking position, so that the locking element holds the actuation element in its unlocking position in the case of a discharged (first) power source or undersupplied vehicle electrical system.

FIGS. 9 and 10 show that a corresponding transport state of the motor vehicle is implemented. For this purpose, the bistable switch 8 is first brought into its open position, starting from the first operating state, by activation by means of the vehicle electrical system 16 (FIG. 9). Thus, the current circuit 7 is open and the actuator 5 is inactive, the locking element 4 fixes the actuation element 2 in a form-fitting manner when the parking lock 3 is open. Finally, if both the vehicle electrical system power source 18 and the first power source 6 are completely discharged, it is still possible to move the motor vehicle (FIG. 10).

Figure 11:
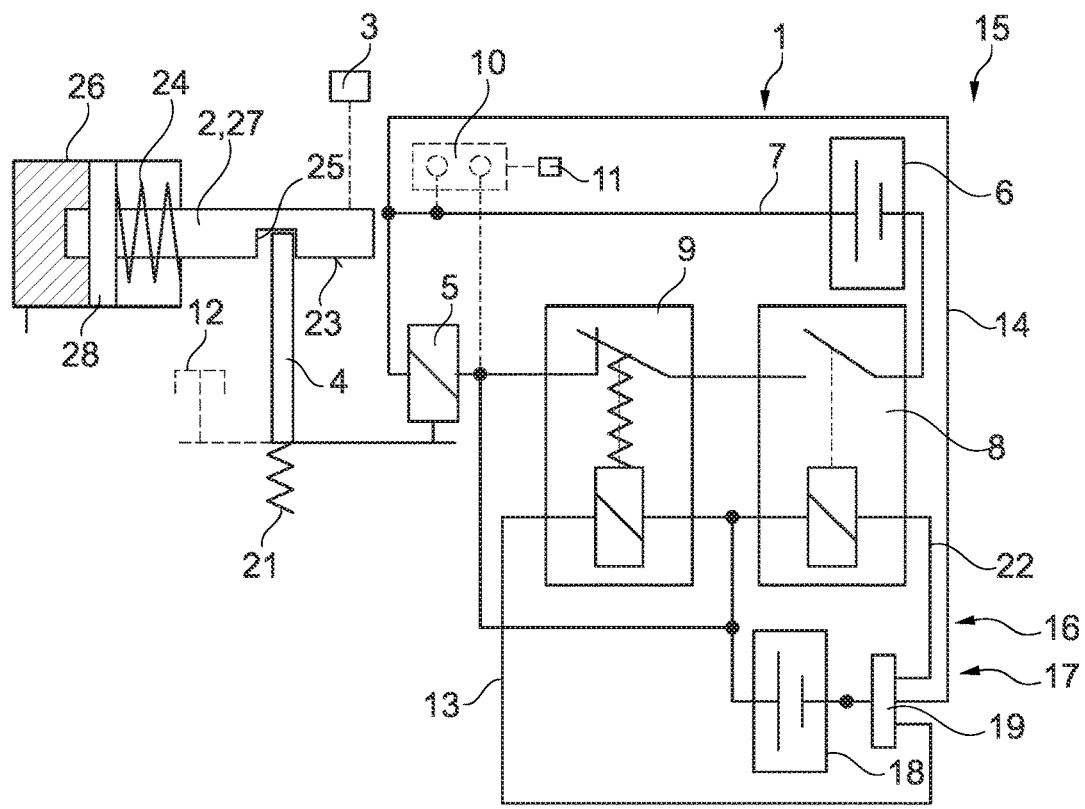
FIG. 11 shows a schematic representation of a parking lock actuation system according to the present disclosure, designed according to a third exemplary embodiment, wherein, in comparison to the first exemplary embodiment, the vehicle electrical system does not control the opener with the interposition of a monostable closer, but via the control unit of the vehicle electrical system.

FIG. 11 then illustrates a third exemplary embodiment, which is essentially based on the first exemplary embodiment. In contrast to the first exemplary embodiment, the monostable closer 20 is dispensed with in this embodiment and the control device 19 is connected directly to the monostable opener 9 via the first sub-circuit 13. Thus, the monostable opener 9 is actuated directly via the control device 19.

Figure 12:
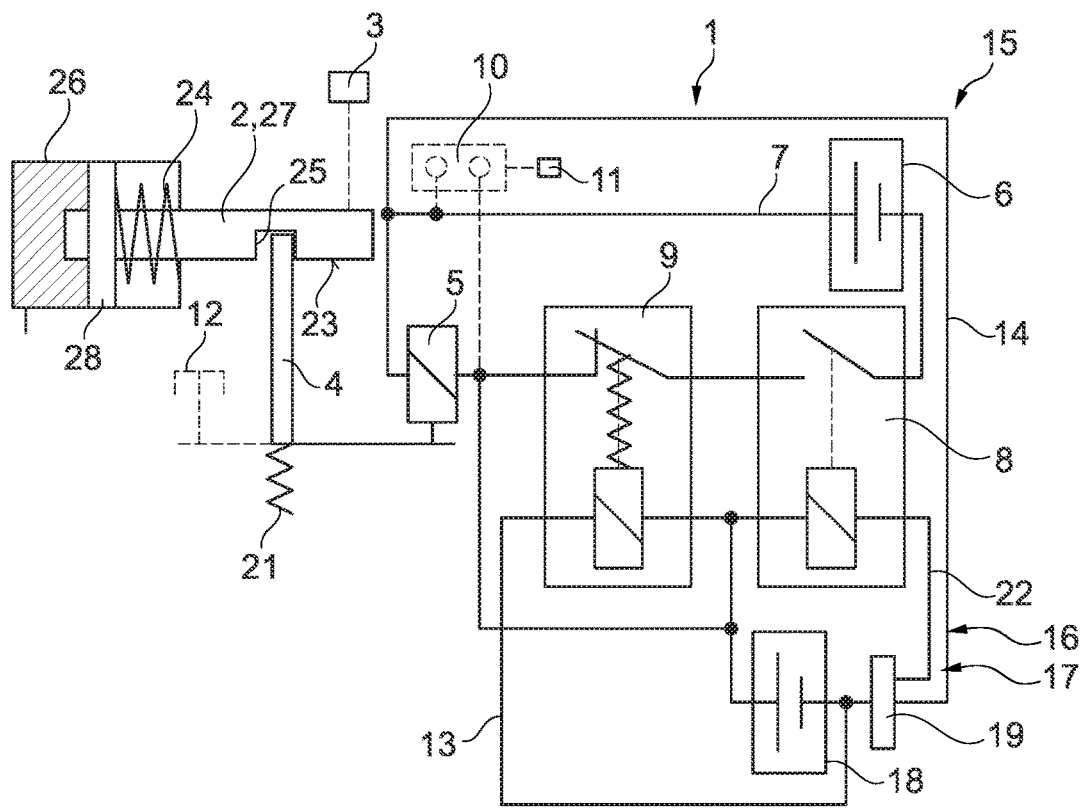
FIG. 12 shows a schematic representation of a parking lock actuation system according to the present disclosure, designed according to a fourth exemplary embodiment, wherein a vehicle electrical system power source is connected directly to the monostable opener.

According to FIG. 12, it is expedient as an alternative to this to connect the vehicle electrical system power source 18 directly to the monostable opener 9 and to operate the monostable opener 9 directly via this vehicle electrical system power source 18 and to keep it in its opened position with the vehicle electrical system power source 18 switched on and sufficiently charged.

In other words, a locking element 4 (pin, hook, pawl, etc.) is preferably proposed to be transverse to the actuation element 2 of the parking lock 3, which can be electrically disengaged by means of an electromechanical linear actuator 5 (e.g., lifting magnet) and passively (e.g., spring-loaded) in a corresponding recess 25 (transverse groove, optionally also a projection, generally a form fit) in the actuation element 2. The position of the form-fitting element 25 is selected such that the parking lock 3 is held open against the force of the return springs 24 as soon as the locking element 4 is engaged.

In addition to the vehicle electrical system current supply circuit of the vehicle, the actuation of the parking lock operation includes a separate (redundant) circuit 7 for the parking lock 3, which does not require any electronic components. Two batteries (also referred to as the first power source 6 and the vehicle electrical system power source 18) are therefore available as voltage sources. Actuation is implemented via three electrical switches 8, 9, 20 (e.g., relays/relay switches).

In a first variant, the current circuit 7 for direct current supply (to unlock the actuation element 2 and thus close the parking lock 3) runs via the redundancy battery (first power source 6), a monostable opener 9 and a bistable switch 8. The bistable switch 8 is actuated via the vehicle electrical system battery (vehicle electrical system power source 18) and the parking lock control device 19.

The actuation of the monostable opener 9 takes place via the vehicle electrical system battery and a monostable closer 20, which is actuated via the vehicle electrical system battery and the parking lock control device.

For normal driving, the switch 8 will be or is switched closed (stable). To open the parking lock 3, the closer 20 is first closed via the parking lock control device 19. The current circuit 13 for actuating the opener 9 is thus closed, so that the opener 9 is opened. Thus, the current circuit 7 for driving the linear actuator 5 is open. If the parking lock 3 is now opened hydraulically, the holding element (also referred to as the locking element 4) can mesh under spring loading (since it is not held open by the linear actuator 5; FIG. 4).

The pressure in the parking lock actuating cylinder 26 can now be removed to open the parking lock 3, since the parking lock 3 is now held open by the locking element 4 (FIG. 5).

Normally-P functionality: If the vehicle electrical system 16 fails (no current from vehicle electrical system power source 18), the closer 20 opens; so that the current circuit 13 of the opener 9 is open, so that it closes. When the opener 9 is closed, the current circuit 7 is closed to the linear actuator 5 via the redundancy battery (first power source 6), so that it disengages the locking element 4 and thereby closes the parking lock 3 (FIG. 6).

The regular closing process can also be carried out in the same way. For this purpose, the current supply to the closer 20 is actively interrupted by the parking lock control device 19 (FIG. 6).

It is optionally proposed to provide a connection option 10 for an external (e.g., 12V) power source 11 parallel to the linear actuator 5 (e.g., in the vehicle interior). If all the batteries in the vehicle fail completely, the external power source 11 makes it possible to close the parking lock 3 by pulling out the locking element 4 (FIG. 7).

The parking lock 3 can also be closed purely mechanically by an optional, manually operated button 12, which directly disengages the locking element 4 (FIG. 8).

The transport mode (open parking lock 3 regardless of the state of charge of all power sources in the vehicle) is activated by opening the bistable switch 8. This interrupts the current circuit 7 for actuating the linear actuator 5, so that no current can flow to the linear actuator 5, regardless of all the other buttons present and the state of charge of all the batteries (FIG. 9).

The parking lock 3 can now be opened hydraulically, so that the locking element 4 engages and keeps the parking lock 3 passively open. Regardless of which battery is charged or in which order it fails, the parking lock 3 remains open and the vehicle can roll freely (FIG. 10).

A second, extended variant (FIG. 1 and FIG. 2) offers the possibility of closing the parking lock 3 not only by the battery (first power source 6), but also by battery (vehicle power source 18). For this purpose, a further circuit 14 is provided, which connects the linear actuator 5 to the battery (vehicle power source 18) and the parking lock control device 19. Redundancy with regard to opening the parking lock can thus also be implemented. All other states are retained.

In two other variants, only two switches 8, 9 (relays) are required. In a first additional variant (FIG. 11), the opener 9 is supplied directly via the vehicle electrical system battery (vehicle electrical system power source 18) and the electrical control device 19.

In a second additional variant (FIG. 12), the opener 9 is only supplied via the vehicle electrical system battery and is no longer actively actuated via the electrical control device 19. This is possible because the active closing of the parking lock 3 can take place directly via the actuation of the linear actuator 5 for unlocking by the current circuit 7 through the vehicle electrical system battery, the electrical control device 19 and the linear actuator 5.

LIST OF REFERENCE SYMBOLS

1 Parking lock actuation system
2 Actuation element
3 Parking lock
4 Locking element
5 Actuator
6 First power source
7 Current circuit
8 Bistable switch
9 Monostable opener
10 Connecting element
11 External power source
12 Button
13 First sub-circuit
14 Second sub-circuit
15 Drive device
16 Vehicle electrical system
17 Control unit
18 Vehicle electrical system power source
19 Control device
20 Monostable closer
21 Biasing spring
22 Third sub-circuit
23 Outer side
24 Return spring
25 Recess
26 Pressure cylinder
27 Push rod
28 Piston

What is claimed is:

1. A parking lock actuation system for a motor vehicle, the parking lock actuation system comprising:
    an actuation element moveable between a locking position, in which a parking lock of the motor vehicle is active, and an unlocking position, in which the parking lock is inactive;
    a locking element configured to fix the actuation element in the unlocking position in a form-fitting manner;
    an electric actuator which has an adjusting effect on the locking element; and
    a current circuit having an autonomous power source, the current circuit being connected to the electric actuator, a bistable switch and a monostable opener arranged in series with the bistable switch being used in the current circuit.

2. The parking lock actuation system according to claim 1, wherein the current circuit is equipped with a connecting element for connection to an external power source.

3. The parking lock actuation system according to claim 1, wherein the locking element is provided with a mechanical button for manual actuation.

4. The parking lock actuation system according to claim 1, wherein the monostable opener is configured in such a way that the monostable opener is closed in a spring-supported basic position of the monostable opener.

5. The parking lock actuation system according to claim 1, wherein the locking element is spring-loaded in such a way that when the actuation element is actuated, the locking element automatically locks 4 the actuation element in an open position of the parking lock or the locking element is pressed against the actuation element in a basic portion of the parking lock actuation system.

6. A drive device for a motor vehicle comprising the parking lock actuation system according to claim 1 and a system which coupleable or connected to a vehicle electrical system power supply for independently actuating the bistable switch and a control unit connected to the monostable opener.

7. The drive device according to claim 6, wherein a first sub-circuit of the control unit controlling the monostable opener implements a direct coupling of a vehicle electrical system power source to the monostable opener or an indirect coupling of the vehicle electrical system power source via a control device and/or a monostable closer with the monostable opener.

8. The drive device according to claim 6, wherein a second sub-circuit of the control unit is also connected directly to the electric actuator.

9. A method for actuating the parking lock actuation system according to claim 1, wherein in a first operating state the bistable switch is closed and the monostable opener is open, so that the current circuit is interrupted and the locking element is engaged in a form-fitting manner with the actuation element, wherein the actuation element is fixed in the unlocking position, and in a second operating state in which a voltage of a vehicle electrical system couple to monostable opener has fallen to zero or below a specific limit, the monostable opener closes automatically, so that the current circuit is closed and the electric actuator is driven by breaking a form fit between the locking element and the actuation element, so that the actuation element is automatically moved into the locking position.

10. The method according to claim 9, wherein a switch is made from the first operating state to a transport state by opening the bistable switch.

11. A parking lock actuation system for a motor vehicle, the parking lock actuation system comprising:
    an actuation element movable between a locking position, in which a parking lock of the motor vehicle is active, and an unlocking position, in which the parking lock is inactive;
    a locking element configured to engage the actuation element in a form-fitting manner to fix the actuation element in the unlocking position;
    an electric actuator configured for adjusting the locking element; and
    a current circuit having an autonomous power source, the current circuit being connected to the electric actuator, the current circuit including a bistable switch and a monostable opener arranged in series with the bistable switch, the locking element being engagable in the form-fitting manner with the actuation element when the current circuit is interrupted, the electric actuator configured for breaking a form fit engagement between the locking element and the actuation element when the current circuit is closed.

12. The parking lock actuation system according to claim 11, further comprising a biasing spring biasing the locking element into engagement in the form-fitting manner with the actuation element when the current circuit is interrupted.

13. The parking lock actuation system according to claim 12, wherein the electric actuator is configured for pressing against the biasing spring when the current circuit is closed.

14. The parking lock actuation system according to claim 11, wherein the current circuit is configured such that in a first operating state the bistable switch is closed and the monostable opener is open, so that the current circuit is interrupted and the locking element is engaged in the form-fitting manner with the actuation element, fixing the actuation element in the unlocking position.

15. The parking lock actuation system according to claim 14, wherein the current circuit is configured such that in a second operating state in which a voltage of a vehicle electrical system couple to the monostable opener has fallen to zero or below a specific limit, the monostable opener closes automatically, closing the current circuit and driving the electric actuator for breaking a form fit between the locking element and the actuation element, so that the actuation element is automatically moved into the locking position.

16. The parking lock actuation system according to claim 11, wherein the monostable opener is biased toward a closed position of the monostable opener, and when driven the monostable opener is forced into an open position of the monostable opener.

17. The parking lock actuation system according to claim 11, further comprising a connecting element for connection to an external power source, the electric actuator being actuatable by the connecting element when the connecting element is connected to the external power source.

18. The parking lock actuation system according to claim 11, further comprising a mechanical button for manual actuation to directly disengage the locking element.

19. The parking lock actuation system according to claim 11, wherein the actuation element is forceable in a first direction by a return spring and in a second direction opposite the first direction by a pressure cylinder.

20. The parking lock actuation system according to claim 19, wherein the locking element prevents the actuation element from moving in the first direction and in the second direction when the locking element engages in the form-fitting manner with the actuation element.

* * * * *